(12) United States Patent
Chien

(10) Patent No.: US 7,901,115 B2
(45) Date of Patent: Mar. 8, 2011

(54) SURFACE MOUNTED DEVICE WITH LED LIGHT

(76) Inventor: Tseng-Lu Chien, Shi-Chi Town (TW)

( * ) Notice: Subject to any disclaimer, the term of this patent is extended or adjusted under 35 U.S.C. 154(b) by 0 days.

(21) Appl. No.: 12/149,964

(22) Filed: May 12, 2008

(65) Prior Publication Data

US 2008/0259615 A1    Oct. 23, 2008

(51) Int. Cl.
*F21V 21/00*    (2006.01)
(52) U.S. Cl. .......... 362/397; 362/382; 362/800; 362/109
(58) Field of Classification Search .................. 362/397, 362/382, 800, 109
See application file for complete search history.

(56) References Cited

U.S. PATENT DOCUMENTS

| | | | | |
|---|---|---|---|---|
| 4,811,173 A | * | 3/1989 | Johnson | 362/540 |
| 5,311,417 A | * | 5/1994 | Heh | 362/397 |
| 5,361,195 A | * | 11/1994 | Chen | 362/397 |
| 5,491,621 A | * | 2/1996 | Duty | 362/397 |
| 6,428,180 B1 | * | 8/2002 | Karram et al. | 362/119 |
| 2003/0090895 A1 | * | 5/2003 | Guerrieri | 362/156 |
| 2005/0047130 A1 | * | 3/2005 | Waters | 362/231 |

* cited by examiner

*Primary Examiner* — Sandra L O Shea
*Assistant Examiner* — Jessica L McMillan
(74) *Attorney, Agent, or Firm* — Bacon & Thomas, PLLC

(57) ABSTRACT

A surface mounted device has a built-in or added-on LED light arranged to fit within the device and to include parts and accessories such as a power source, circuit means, conductive means, switch means, sensor means, t integrated circuit, LED elements in a variety of specifications, timer means, solar power, AC power and parts, or DC power and parts to get desired light, function, and performance effects such as pre-determined color, brightness, duration, function, and light show effects to provide attractive area illumination with low power consumption.

17 Claims, 10 Drawing Sheets

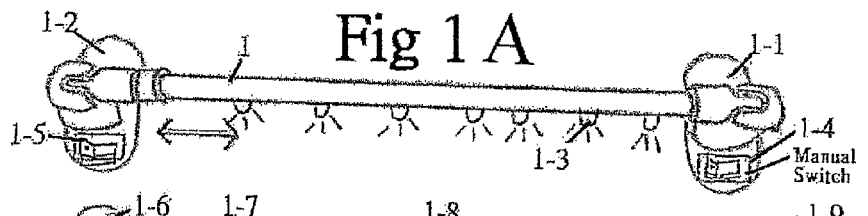
Fig 1A
Fig 1B
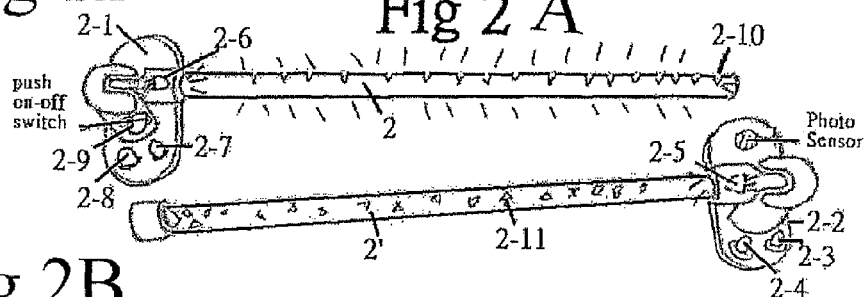
Fig 2A
Fig 2B
Fig 3A
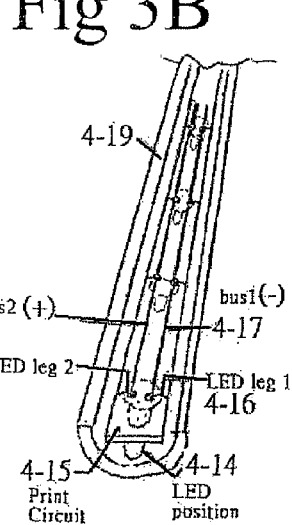
Fig 3B
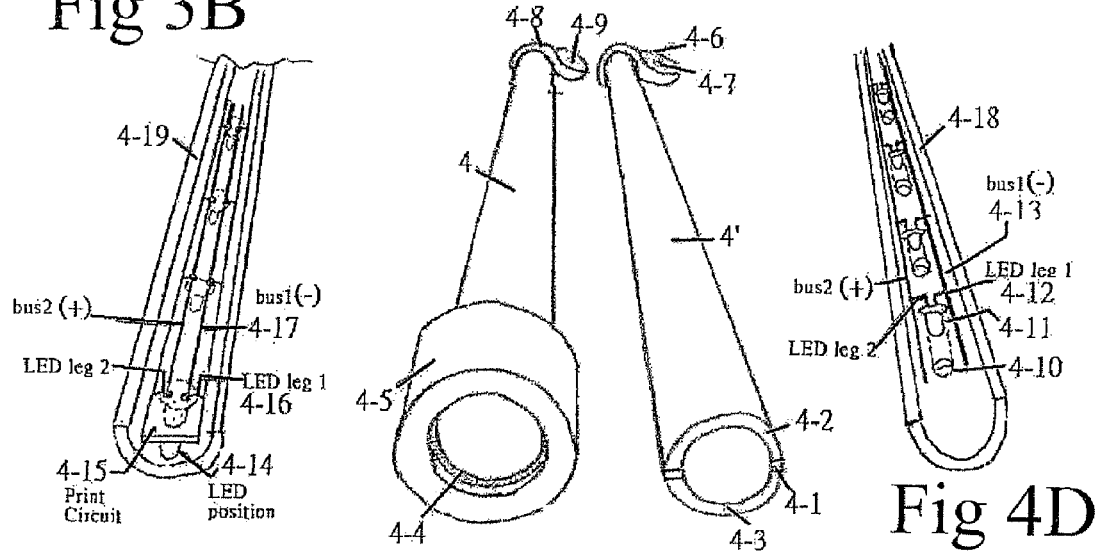
Fig 4A  Fig 4B  Fig 4C  Fig 4D

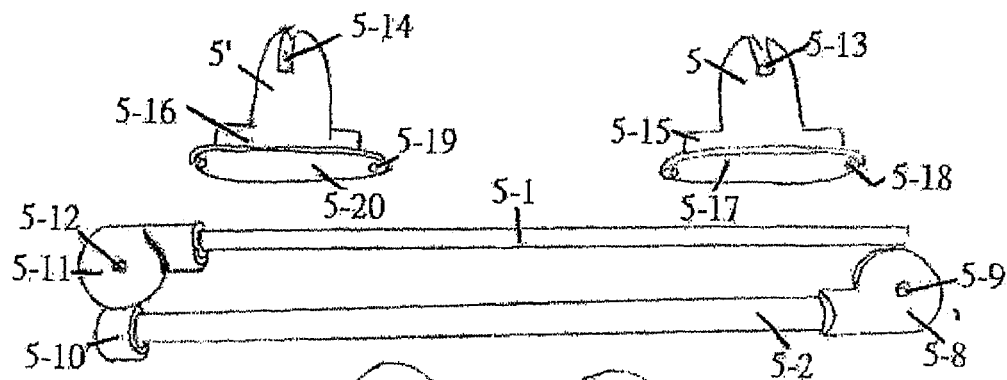
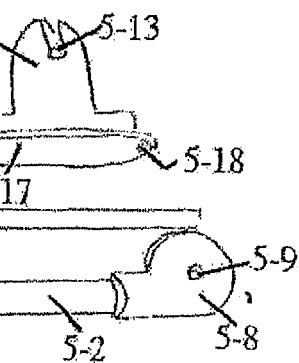
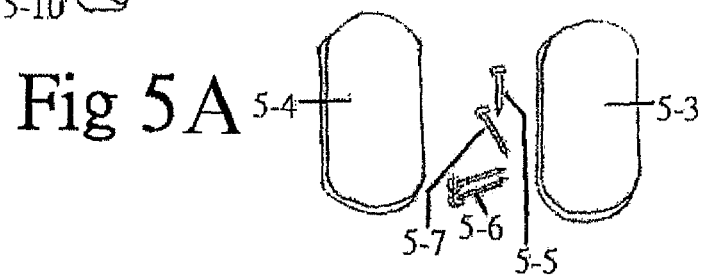
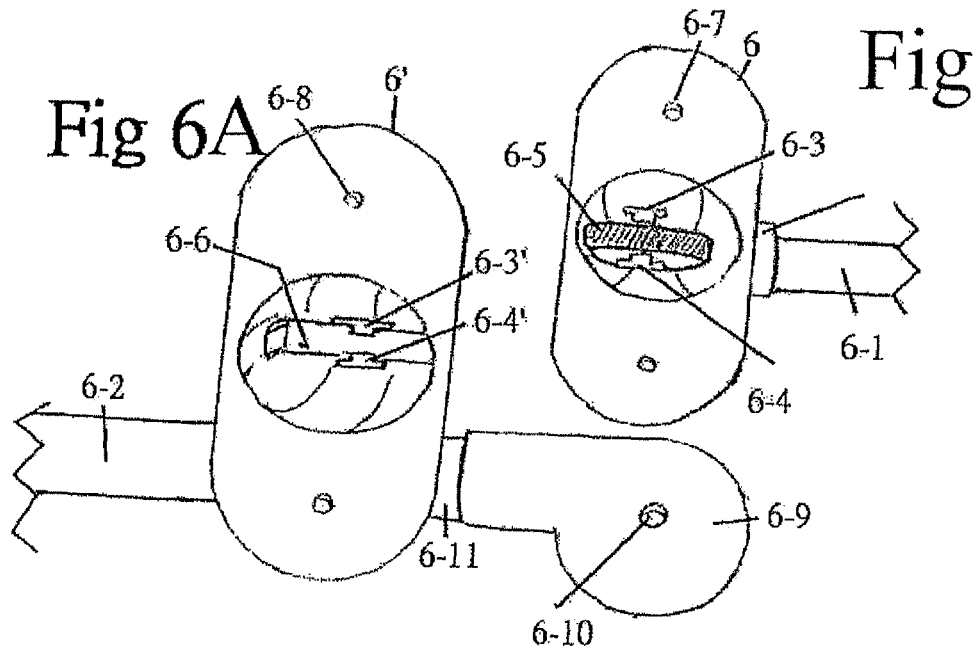

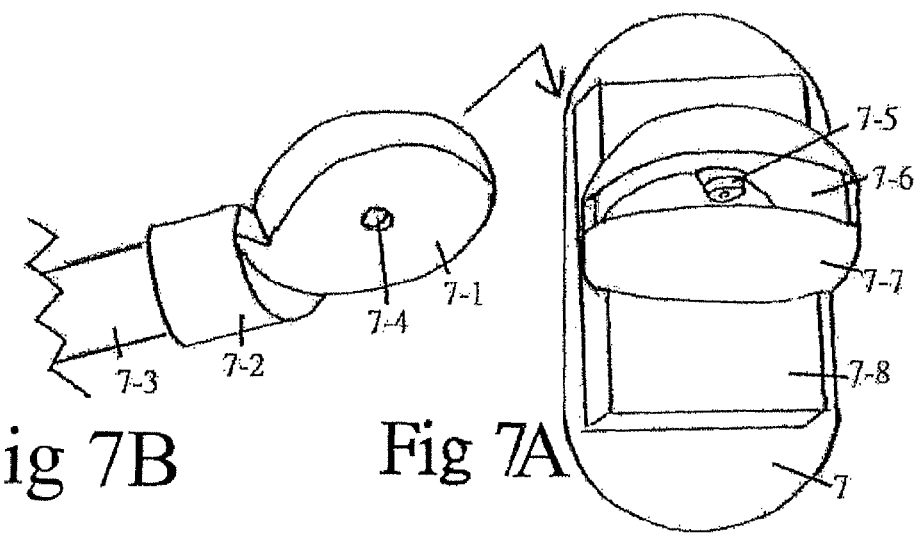
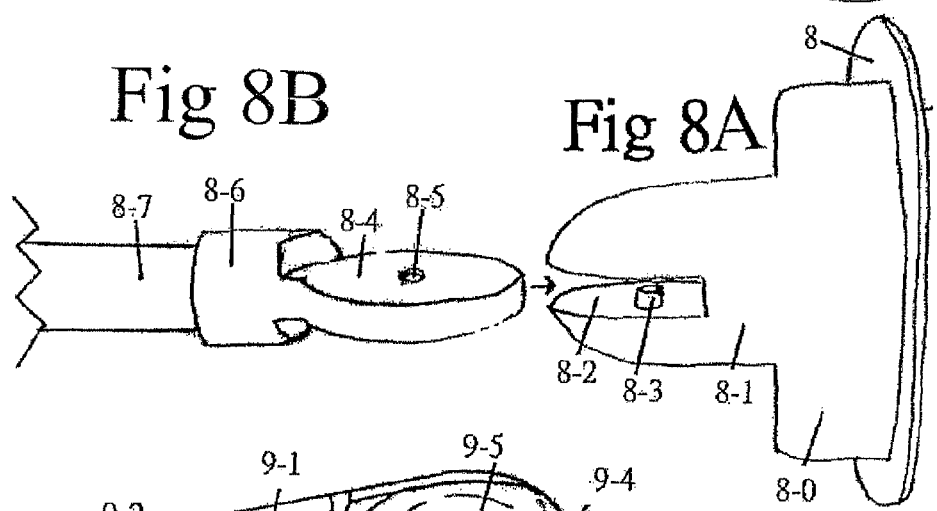
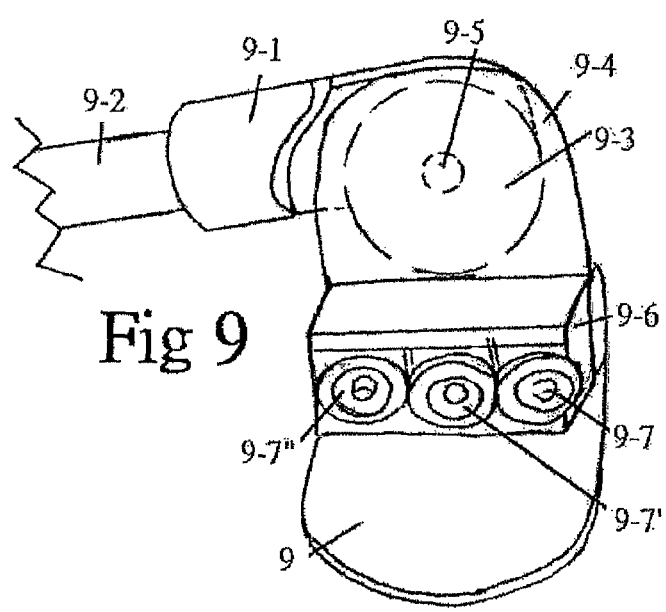

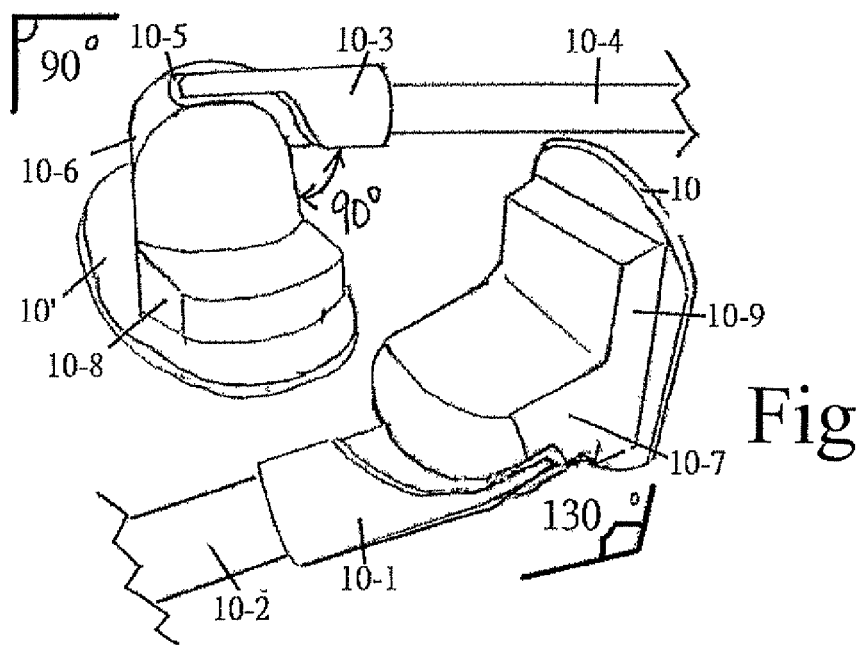
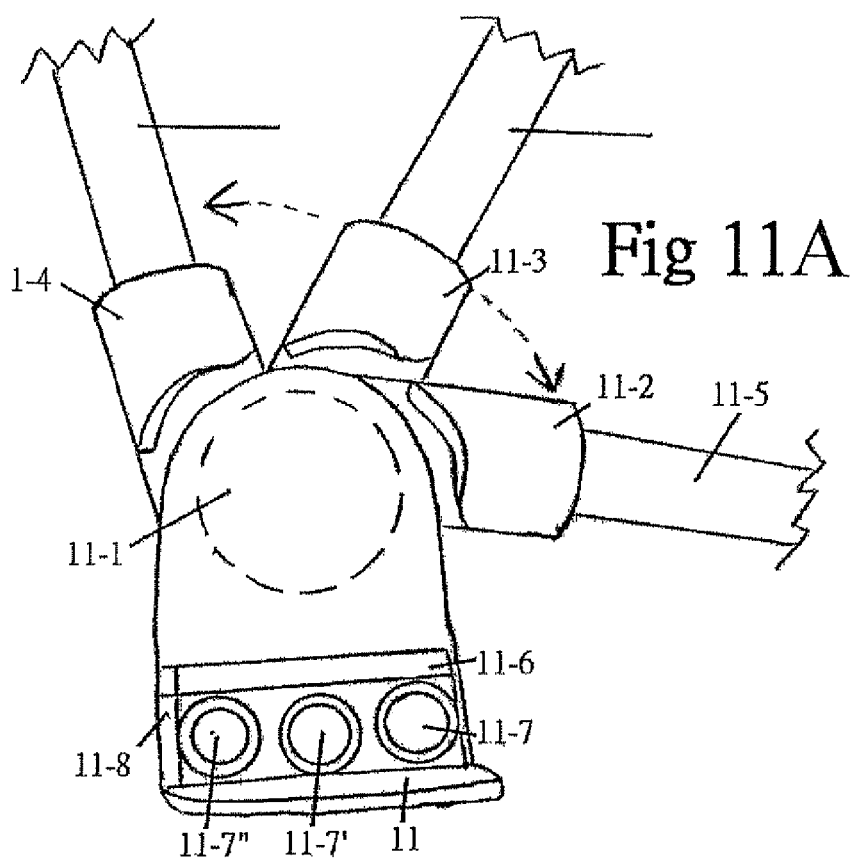

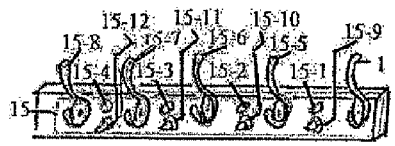
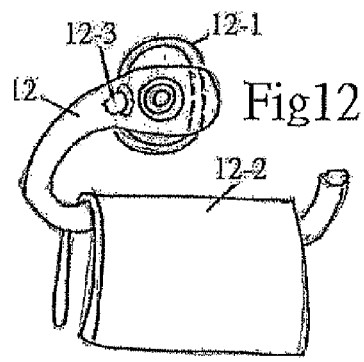
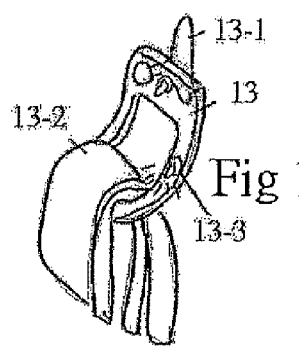
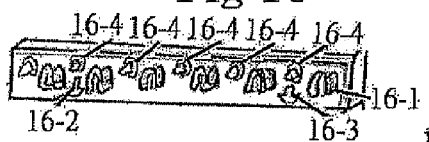
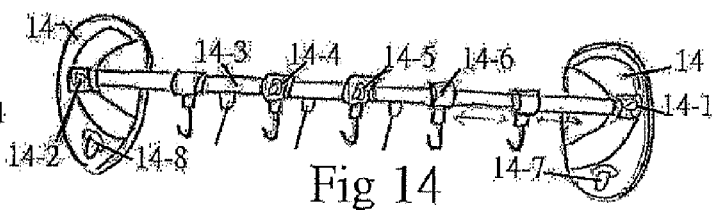
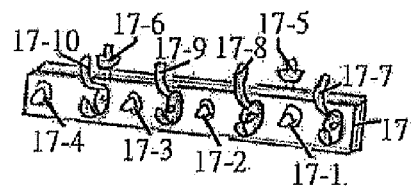
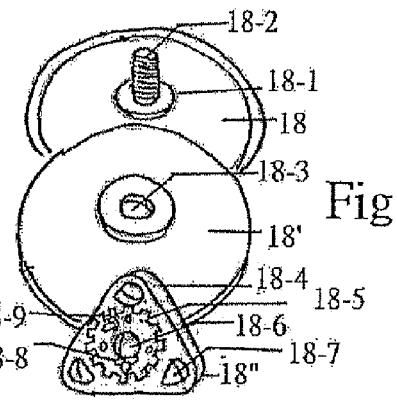
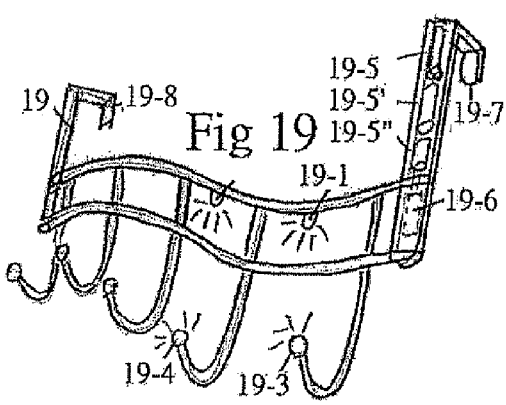
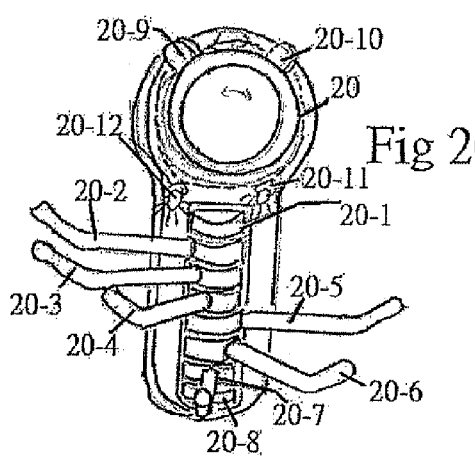

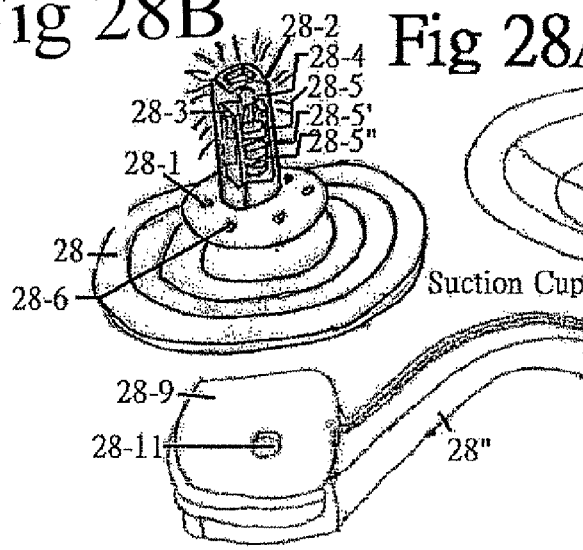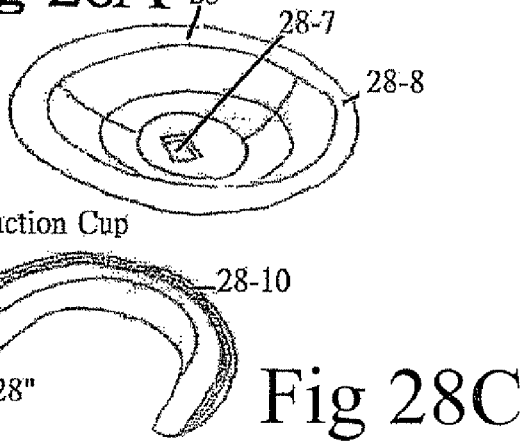
Fig 28A, Fig 28B, Fig 28C
Suction Cup
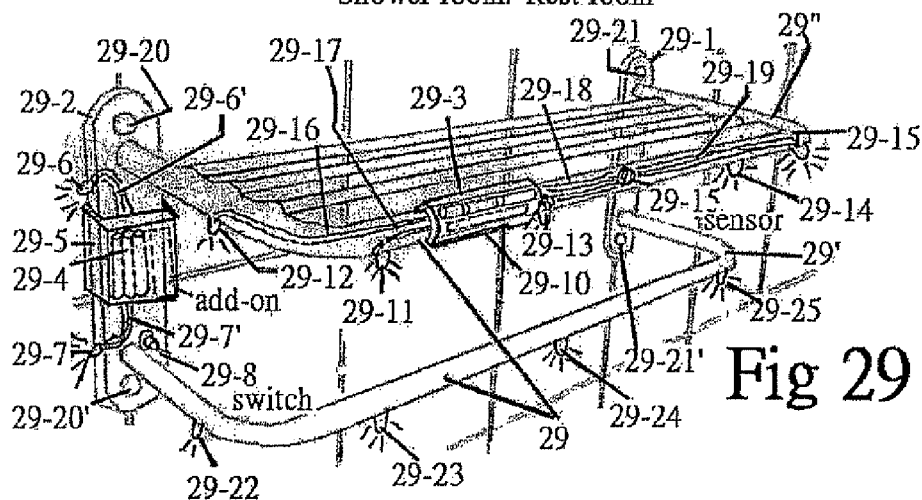
Fig 29
Shower room / Rest room
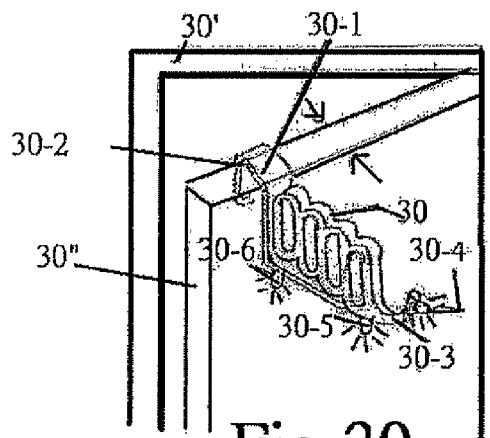
Fig 30
Door / Fence / Board
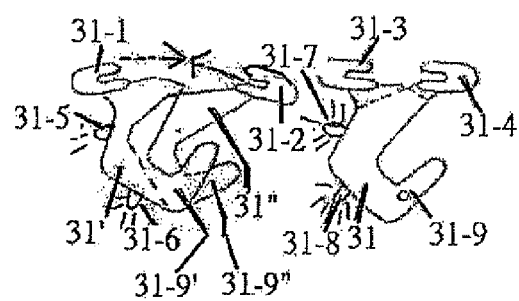
Fig 31
Office Ceiling Rack Bathroom/Rest Room/ Toilet Laundry Room Rest room / Bath room Anywhere

SURFACE MOUNTED DEVICE WITH LED LIGHT

BACKGROUND OF THE INVENTION

This is has subject matter in common with U.S. patent application Ser. Nos. 12/073,889 ("LED track light device"); 12/073,095 ("LED light with changeable position with Preferable power source"); 12/007,076 ("LED light with changeable geometric system"); 12/003,691 ("LED light with changeable geometric dimension features"); 12/003,809 ("LED light with changeable features"); 1/806,711 ("Multiple LED light with adjustable angle features"); 1/527,631 ("LED Night light with interchangeable display unit"); 11/498,881 ("Poly Night light"); 1/255,981 ("Multiple light source Night Light"); 1/094,215 ("LED Night light with Liquid optics medium"); 11/092,741 ("Night light with fiber optics"); 10/883,747 ("Fiber Optic light kits for footwear"); 11/498,874 ("Illumination for LED night light"); 11/498,874 ("Time Piece with LED night light"); 11/527,628 ("Multiple Function Night light with Air Freshener"); 11/806,284 ("LED Night light with more than one optics mediums"); 11/806,285 ("LED Night Light with multiple function"); and 11/806,711 ("Multiple LEDs Light with adjustable angle function").

The current invention is an LED light add-on to the existing market available surface mounted device that allows people to cover a desired area with illumination by super power-saving LED light when they purchase the surface mounted device.

The U.S. prior art includes a lot of LED light products to install under a cabinet or in a bedroom or kitchen, but these products provide only for illumination without any additional and practical functions, which is a waste of money because to such LED light products still have a housing and cost almost the same as an LED light with multiple functions.

U.S. Pat. No. 6,672,552 (Jao), issued Jan. 6, 2004, discloses a "Supporting rod assembly providing luminous decorating effects." Jao's patent describes a crossbar (12) made of a transparent plastic material through integral injection molding and which may have a round or any other different cross section. A row of (14) axially arranged air bubbles (15) is formed in the crossbar (12) using a currently available plastic injection-molding technique. This results in a bar that is too weak, because of the air bubbles within the tube, for storage purposes. The current invention adds on or builds in the LED light unit within the existing unit but without the air-bubble within. This makes a big difference since the air bubble creates a lot of hollow space within the bar to make it very weak against any applied weight.

Also, the LED light unit of the invention has the advantage that is can be added on anywhere instead of only having application to the transparent tube (12), the LEDs (21) having to be installed on each end to shine into transparent tube. The current invention preferably utilizes the LED's strong light beams and by letting people see them.

U.S. Pat. No. 6,588,915 discloses a hanging device which has a fluorescent tube as a light source to provide illumination. The fluorescent tube has big power consumption and needs a big circuit to provide the fluorescent tube trigger current. The current invention uses a super power saving LED light unit with a super compact circuit so that the unit can easily be installed within any housing to make a big improvement the hanging light device of U.S. Pat. No. 6,588,915.

There also have been a lot of surface mounted devices for storage, hanging, arrangement, putting, placing, or organizing anything to use anywhere people stay, but none of surface mounted devices has a power saving LED light add-on to the device, which may be built-in or added-on to the surface mounted device. A surface mounted device such as a hook, hanger, suction cup, rack, tray, holder, rob, tube, or wire product, may use a different installation method or skills from the market available ways to install the device on an object's surface to use for kitchen ware, bathroom accessories such as a towel, tooth brush, soap, lotion, bottle, or can, textile items, hair dryers, shavers, clothing including a hat, cap, garment, or coat, paper, tissue, a hair clipper, sunglasses, or a sponge, towel, brush, plastic tool, garden tool, working tools, wind chime, plants, and/or almost anything can be used anywhere in a building, house, car, boat, van, vessel, or aircraft. However, none of the conventional surface mounted devices provides light for illumination, so this invention make a big improvement for all non-lighted surface mounted device(s).

The surface mounted device can be mounted on the surface of a building, closet, table, ceiling, wall, glass, plastic, wooden, porcelain, pottery, paper, chemical, bar, tube, rib, rod, door, or other object's surface by conventional skill which may selected from group including glue, double side tape, Velcro, loops and hooks, snap, quick connector, clip, connector means, rivet, stitching, nail, screw, suction cup, hanger, chemical compound, super glue, silicone for home, office, building, van, car, bus, vessel, boat, aircraft, space shutter applications to hold, hang, storage, put, arrangement the other object(s) at a desired location and space.

For example, the surface mounted device may be a hook, hanger, metal-wire product, bar related product, suction cup product to use for a house ware product, or may take the form of any of a variety of kitchen ware products, laundry room products, shower room products, bathroom products, living room, bed room, or garage related products, patio related products, garden related products, and/or outdoor related products.

The current invention adds an LED light within the surface mounted device because an LED can easily be added to the surface mounted device and has the following advantages:

1. Very lower power consumption with super compact size so a battery will last for a long period of time while properly incorporated with switch means, sensor means, timer means to control the LED light duration, brightness, color, functions.
2. the LED current is Direct Current (hereinafter DC) with very lower voltage and amperage and without high heat or electric shock hazard, unlike an incandescent bulb or halogen light.
3. The LED can incorporate desired switch means to provide illumination According to predetermined functions, duration, brightness, and/or color.
4. An LED has low cost and almost lifetime quality and therefore does not need replacement like an incandescent or halogen bulb.
5. An LED light only need a small amount of electricity to turn on for super brightness and therefore does not need a big inverter or transformer in contrast to an incandescent, halogen, fluorescent, or cold cathode light means which requires a large space need inside the surface mounted device, so that the LED light can easily be installed within the surface mounted device by being built-in or by an add-on arrangement.

The current invention offers an environmental grade LED light within the surface mounted device to save a lot of electricity and reduce the toxicity of bulb replacement on the environment to enable human beings to have a good living environment.

The current LED light for a surface mounted surface device can utilize a plurality of LED-units. The current invention has a very simple construction similar to the various devices disclosed in copending U.S. patent application Ser. Nos. 12/007,076, 12/003,809, 11/806,711, 11/806,285, 11/806, 284, 11/527,628, 11/527,629, 11/498,874, 11/527,631, 11/498,881, 11/255,981, 11/184,771, 11/152,063, 11/094, 215, 11/092,742, 11/092,741.

The current invention also has conductive means to deliver the electric signals from the power source, and circuit means to trigger the LED-unit's LED or LEDs for a desired light performance. Each LED-unit may incorporate not only such conductive means, but also or alternatively may include resilient conductive means, contact-means, rotating means, tilt means to build rotating or tilt properties into the LED-units to freely adjust the light emitting angle or directions to desired areas for illumination.

BRIEF DESCRIPTION OF THE DRAWINGS

FIGS. 1-11A show a first preferred embodiment of a surface mounted device for wall installation with adjustable length and angle features to allow garment storage. The drawings show different details of the preferred embodiment, including construction, alternative arrangements, assembly procedures, components, space arrangement and optics improvements, LED location, and illumination areas, etc.

FIGS. 12-43 show other preferred embodiments of a surface mounted device for permanent or temporary installation on various objects' surfaces. Some application provide for quick installation and removal to other locations for example by means of a suction cup, hanger, clip, snap, removable glue, removable tape, telescoping hook or equivalent mounting and replacement means available from the marketplace. Each different preferred embodiment has a detailed description for the application and an LED light arrangement is provided on each embodiment.

DETAILED DECRYPTION OF THE PREFERRED EMBODIMENTS

Figure 21:
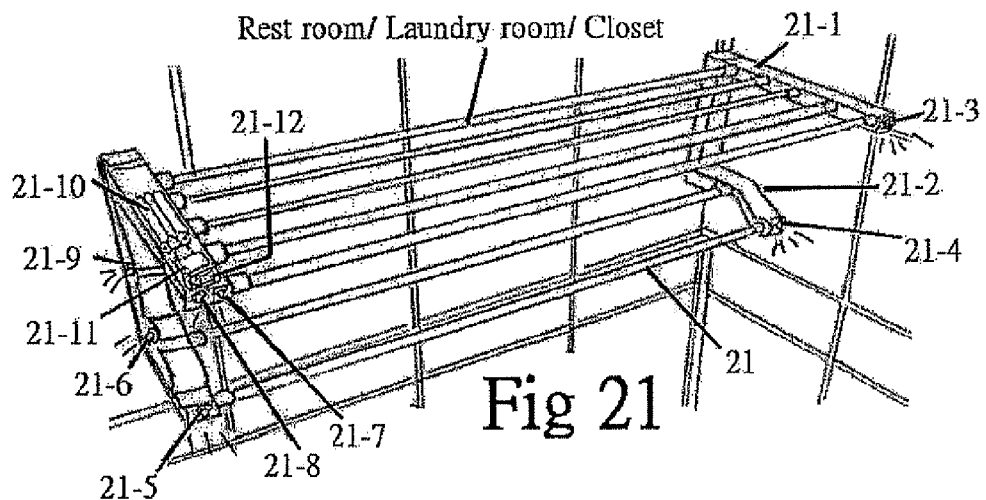

The surface mounted device with LED light of the current invention is applied to:
at least one of surface mounted device to be mounted on a building, closet, table, ceiling, wall, glass, plastic, wooden, porcelain, pottery, paper, chemical object, bar, tube, rib, rod, door, or other object's surface by conventional skill such as by glue, double side tape, snap, quick connector, connector means, clip, rivet, stitching, Velcro, loops and hooks, nail, screw, suction cup, hanger, chemical compound, super glue, silicone for inside or outside a home, office, building, car, bus, van, vessel, boat, or aircraft, and/or space utilization applications to hold, hang, store, put, or arrange other object(s) at a desired location, space, position, or orientation within the surface mounted device, and includes at least one LED light arranged to fit within the surface mounted device at a desired location and connect with a preferred conductive means, resilient conductive means, power source, switch means, and/ or circuit means to deliver electric signals from a power source to the LED light(s) for illumination according to a pre-determined function, timing, duration, brightness, and/or colors. Furthermore, the current invention provides the improvement In which the surface mounted device has space to fit the LED light, conductive means, resilient conductive means, switch means, power source, circuit means and related parts such as a sensor means, timer means, energy generator, solar module, rechargeable batteries, batteries, AC power source, and/or DC power source.

More specifically, as shown in FIG. 1, a first preferred embodiment includes a surface mounted device for installation anywhere in a housing, office, building, garden, kitchen, washroom, bedroom, restroom, dining room, living room, car, bus, van, vessel, boat, ship, aircraft or any other transportation equipment, or any other place that people might stay, whether indoors or outdoors. The surface mounted device shown in FIG. 1 is a towel hanger (1) having two bases (1-1) (1-2) to hold an elongate tube and a plurality of LED light units (1-3) within the tube that are arranged to emit light to a desired area. The LED light may be control by a manual switch (1-4), slide switch (1-5), sensor switch (1-10), or other kind switch available from the marketplace. The tube can be made extendable upon pulling the tube from the two bases (1-6) (1-9), the inner small diameter tube (1-7) being extended to make the total length become longer than that of the original outer big diameter tube (1-8).

FIG. 2 is a version of the LED light arrangement of the first preferred embodiment, in which the left base (2-1) has LED light units (2-6) (2-7) (2-8) at desired locations to cause light beams to be emitted into the tube or outward from the base. The LED units (2-6) (2-7) (2-8) are powered by built-in direct current batteries (not shown) with appropriate electric circuit means (not shown), and switch means such as the push-on-off switch (2-9) to provide the LED light units with a desired light function, brightness, and color. The LED light unit (2-6) may be arranged on the end of the tube and emit the light beams into the clear or opaque tube (2) to cause the light beams to travel along the tube to provide desire light effects. The tube does not have the air bubbles of the tube disclosed in prior art U.S. Pat. No. 6,672,552, which is very weak because there are too many empty hollows within the tube. The current invention with extendable tube and adjustable base with angle adjustment provides a big improvement over the lighting arrangement disclosed in U.S. Pat. No. 6,672,552 as well as the light means of U.S. Pat. No. 6,588,915, which uses a florescent tube and therefore requires a big circuit to change the current into a fluorescent tube trigger current. A fluorescent tube also requires a relatively large amount of power in comparison with the current invention's LED light means.

The clear tube (2) can be a solid tube for certain requirements in the marketplace. When using a solid tube (2), the tube may include an optics arrangement to make the light become brighter at spots, by providing small cut-outs (2-10) with pre-designed cut-out depth, angle, and size. Such an alternative optics arrangement, which enables a solid tube to exhibit special effects still falls within the scope of the current invention. The right base (2-2) has LED light units (2-3) (24) (2-5) arranged within the bigger diameter outer tube (2'), and which may take the form of a clear but empty tube which can have another medium in liquid or gel form within the empty tube (2'), such as water, oil, or a chemical compound. The LED light beams from LED light unit (2-5) can travel within the other medium with a desired optics function being provided by a reflective-material, miniature glass piece, silver powder or other material situated with the medium to cause the light beam to be reflected or diffused to provide a viewer with satisfactory performance and meet market requirements.

FIG. 3 shows details of the construction of the small diameter tube (3) and bigger diameter tube (3') with the connector ring (3-1). The small diameter tube (3) can fit into the bigger diameter tube (3') and connector ring (3-1) to cause both tubes (3) (3') to be well assembled together without causing noise and tilt. Both tubes (3) (3') have an end-cover with round shape disc (3-2) (3-4) to enable each tube rotate about the center hole (3-3) (3-5)

FIG. 4 shows details of the big diameter tube (4) and small diameter tube (4') end view. Each tube (4') (4) can be made by two pieces of semi-round shape (4-18) (4-19) so that the LED light can be installed at a desired location. The LED light units (4-11) can fit within the holes (4-10) and connect with bus wire (4-13) by electric conductive means (4-13) such as electric wires, a tube, or other means to deliver electric signals from the power source. Alternative electrical signal supply arrangements will also still fall within the current invention scope, such as providing the LED light units (4-14) on a printed circuit board or the like (4-15), such that each LED leg (4-16) passes through the printed circuit board's hole and connects with the bus conductive means (4-17) to enable each of the LED light units to be sealed within the tube and not be exposed outside the tube where the LED lights can be touched. Both LED light unit arrangements still fall within scope of the current invention and it will be appreciated that any alternative, equivalent, or replaceable skill to make the LED light, bus conductive means, LED arrangement, LED position, optics means, LED color, LED specification, LED shape, LED brightness, control means, sensor means, switch means, circuit means, power source means, attachment means, installation means, or related components, parts, and/or accessories for the surface mounted device still fall within the scope of the current invention.

FIG. 5 shows a full set of the parts or accessories for the first preferred embodiment, including a base (5) (5') with a slot opening on the top (5-13) (5-14) a battery compartment (5-15) (5-16), and a bottom (5-17) (5-20) with screw holes (5-18) (5-19) to allow double side tape (5-3) (5-4) to fit on the bottom (5-17) (5-20), or accommodate screws (5-5)(5-6) (5-7) in the screw holes (5-18) (5-19). The small diameter tube (5-1) and big diameter tube (5-2) with the round shape disc (5-8) (5-11) with holes (5-9) (5-12) fits into the slot (5-13) (5-14) to cause the two to have an adjustable angle and appropriate length.

FIG. 6 shows the connection details and space arrangement of the round shape disc (6-5) having holes arranged to receive snap-fit poles (6-3) (6-4) inside the base (6). The other base (6') has its two poles (6-3') (6-4') located near the slot (6-6). The tube (6-11) has a round shape disc (6-9) with a center hole (6-10) for insertion into the base's (6') slot (6-6) and permit the round shape disc (6-9) to snap tight with the two poles (6-3') (6-4').

FIG. 7 shows another view of a tube (7-3) and its round shape disc (7-1) and center hole (7-4) to snap tight with the poles (7-5) which are located inside the slot (7-6) of the geometric shape housing (7-7) of the base (7).

FIG. 8 shows another viewing angle for a tube (8-7) and its round shape disc (8-4) having a center hole (8-5) arranged to receive snap-fit poles (8-3) which are located inside the slot (8-2) of the geometric shape housing (8-1) of the base (8).

FIG. 9 shows a compartment arrangement for a DC power source which may include batteries, circuit means, and conductive means, or for an AC power source including wiring and related parts and accessories. The geometric shape of the housing (9-4) may be designed to provide a special space such as compartment (9-6) to store the DC or AC power source's related parts and accessories and allow the surface mounted device to maintain a nice and neat appearance, without revealing a lot of parts and accessories from the outside. This design should well meet market requirements.

FIG. 10 shows an angle adjustment feature of the first preferred embodiment of the invention wherein the base (10') is oriented at a 90 degree angle with respect to tube (10-4) base (10) is at a 130 degrees with respect to tube (10-2). As shown in FIG. 11A, the base (11) may have a tube (11-5) with a round shape disc (11-1) that receives a snap-fit connection pole (not shown) so the tube (11-5) can adjust the position from (11-5) to (11-3) or (11-4), i.e., from one end of the slot opening to the other end of the slot opening.

FIG. 12 shows a second preferred embodiment, in which surface mounted device (12) is a towel or garment hanger. The device (12) is installed using a suction cup (12-1) and has a built-in LED light unit (12-3) with preferred parts and accessories that may include a power source, circuit means, conductive means, switch means, sensor means, integrated circuit (IC), LED elements in a variety of specifications, timer means, solar power, AC power and parts, DC power and parts to get desired light effects, and performance with a pre-determined color, brightness, duration, and/or function or light show effect.

FIG. 13 shows a third preferred embodiment, in which the surface mounted device (13) is a towel or garment hanger with installation means in the form of a suction cup (13-1) and a built-in LED light unit (13-3) with preferred parts and accessories that may include a power source, circuit means, conductive means, switch means, sensor means, IC, LED elements in a variety of specifications, timer means, solar power, AC power and parts, DC power and parts to get desired light effects, and performance with a pre-determined color, brightness, duration, and/or function, or light show effect.

FIG. 14 shows a fourth preferred embodiment, in which surface mounted device (13) is a hanger device for use, like the hangers of the previously described embodiments, anywhere people stay. The device (14) has a geometric shape that accommodates installation means in the form of double side tape (not shown), and telescoping hook means (not shown) with a built-in or added-on LED light unit. The built-in LED lights (14-1) (14-2) emit light beams into the tube (14-3), and/or LED lights (14-7) (14-8) emit light beams outward of the base (14) (14'). The added-on LED light unit (14-4) (14-5) (14-6) has its own miniature size power source, circuit means, conductive means, switch means, and/or sensor means to add to the removable hook unit. Each of these built-in or added-on LED light units has parts and accessories preferably including a power source, circuit means, conductive means, switch means, sensor means, IC, LED elements in a variety of specifications, timer means, solar power, AC power and parts, and/or DC power and parts to get desired light effects and performance having a pre-determined color, brightness, duration, function, or light show effect.

FIG. 15 shows a fifth preferred embodiment, in which the surface mounted device (15) is a hanger device (15-5) (15-6) (15-7) (15-8) for use anywhere people stay, and having a geometric shape to accommodate installation means in the form of a telescoping hook, nail, screw, or other installation means (15-1) (15-2) (15-3) (15-4) and a built-in LED light unit (15-9) (15-10) (15-11) (15-12) with preferred parts and accessories such as a power source, circuit means, conductive means, switch means, sensor means, IC, LED elements in a variety of specifications, timer means, solar power, AC power and parts, and DC power and parts to get desired light effects and performance with pre-determined color, brightness, duration, function, and light show effects.

FIG. 16 shows a sixth preferred embodiment, in which the surface mounted device (16) is a hanger device (16-3) for use anywhere people stay. The device (16) has a geometric shape that accommodates installation means such as a telescoping hook, nail, screw, or other installation means (16-1) (16-2) and a built-in LED light unit (16-4) and other non-marked LED light units having parts and accessories that may include any or all of a power source, circuit means, conductive means, switch means, sensor means, IC, LED elements in a variety of specifications, timer means, solar power, AC power and parts, and DC power and parts to get desired light effects and performance with a pre-determined color, brightness, duration, function, and/or light show effect.

FIG. 17 shows a seventh preferred embodiment, in which the surface mounted device (17) includes hanger devices (17-7) (17-8) (17-9) (17-10) for use anywhere people stay. The device (17) accommodates installation means such as a telescoping hook, nail, screw, or other installation means (17-5) (17-6) with built-in LED light units (17-1) (17-2) (17-3) (17-4) having preferred parts and accessories such as a power source, circuit means, conductive means, switch means, sensor means, IC, LED elements in a variety of specifications, timer means, solar power, AC power and parts, and DC power and parts to get desired light effects and performance with pre-determined color, brightness, duration, function, and/or light show effects.

FIG. 18 shows an eighth preferred embodiment in which the surface mounted device (18) is a suction cup device having three major components (AA) including suction cup (18) with screw (18-2) and disc base (18-1) injected with a clear suction cup material (BB), cover (10'), (CC) twisted screwed cover (18") which has female screw lines to fasten on the male screw (18-2), the clear suction cup deforming and causing air to be pressed out to provide solid attachment to a smooth surface. This suction cup assembly (18+18'+18") can hang anything on the three corner holes in cooperation with hanging means such as hooks, pins, wire, or equivalent items for use anywhere people stay. The device (18) includes a built-in LED light unit (18-8) (18-9) with preferred parts and accessories selected from any or all of a power source, circuit means, conductive means, switch means, sensor means, IC, LED elements in a variety of specifications, timer means, solar power, AC power and parts, DC power and parts to get desired light effects and performance with pre-determined color, brightness, duration, function, and light show effects.

FIG. 19 shows a ninth preferred embodiment, in which the surface mounted device (19) is a hanger device for use anywhere people stay. The device (17) has a geometric shape that accommodates installation means including a fixed U-shape hook (19-7) (19-8) with a built-in LED light unit (19-1) (19-2) (19-3) (19-4) having preferred parts and accessories such as a power source, circuit means, conductive means, switch means, sensor means, IC, LED elements in a variety of specifications, timer means, solar power, AC power and parts, DC power and parts to get the desired light effects and performance with pre-determined color, brightness, duration, function, and light show effects.

FIG. 20 shows a tenth preferred embodiment, in which the surface mounted device (20) is a multiple hangers device (20-2) (20-3) (20-4) (20-5) (20-6) (20-7) for use anywhere people stay. The device (20) has a geometric shape that accommodates installation means n the form of a quick suction cup with a twist tighten (20-9) or release knob (20-10) and built-in LED light unit (20-11) (20-12) with preferred parts and accessories such as a power source, circuit means, conductive means, switch means, sensor means, IC, LED elements in a variety of specifications, timer means, solar power, AC power and parts, and DC power and parts to get desired light effects and performance with pre-determined color, brightness, duration, function, and light show effects.

FIG. 21 shows an eleventh preferred embodiment, in which the surface mounted device (21) is a rack device (21-1) (21-2) with a plurality of the tubes for use anywhere people stay. The device (21) has a geometric shape that accommodates installation means in the form of a telescoping hook, nail, screw, or other installation means (not shown) and built-in LED light units (21-3) (21-4) (21-5) (21-6) (21-7) (21-8) (21-9) with preferred parts and accessories selected from the group including a power source, circuit means (21-11), conductive means, switch means (21-12), sensor means, IC, LED elements in a variety of specifications, timer means, solar power, AC power and parts, and DC power (21-10) and parts to get desired light effects, and performance with pre-determined color, brightness, duration, function, and light show effects.

Figure 22:
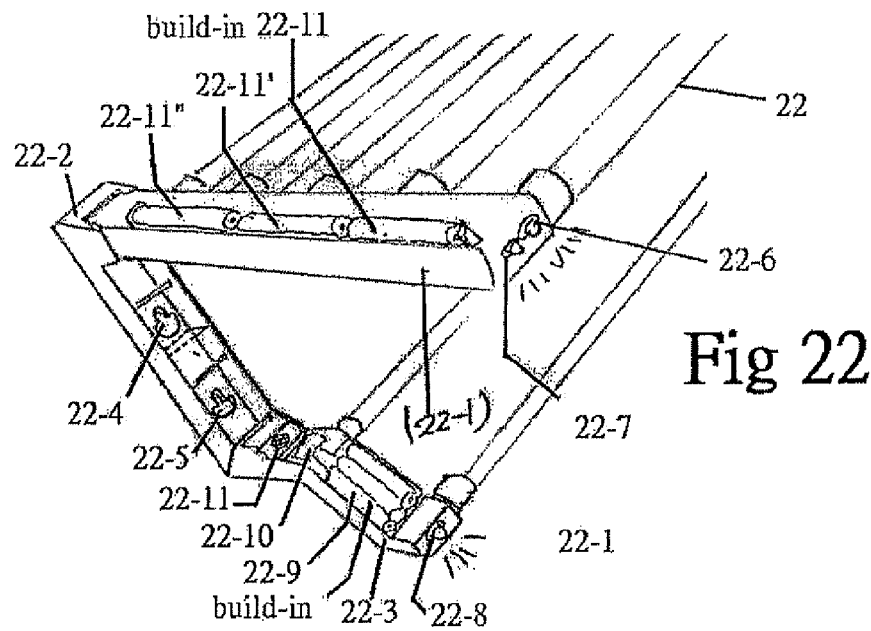

FIG. 22 shows a variation of the eleventh preferred embodiment, in which surface mounted device (22) is a rack device having a plurality of the tubes for use anywhere people stay. The device (22) has a geometric shape that accommodates installation means in the form of a telescoping hook (22-4) (22-5), nail, screw, or other installation means (not shown) and built-in LED light units (22-6) (22-7)(22-8)(22-9) with preferred parts and accessories selected from the group including a power source (22-9), circuit means (22-10), conductive means, switch means, sensor means (22-11), IC, LED elements in a variety of specifications, timer means, solar power, AC power and parts, and DC power (22-11)(22-11') (22-11") and parts to get desired light effects and performance with pre-determined color, brightness, duration, function, and light show effects.

Figure 23:
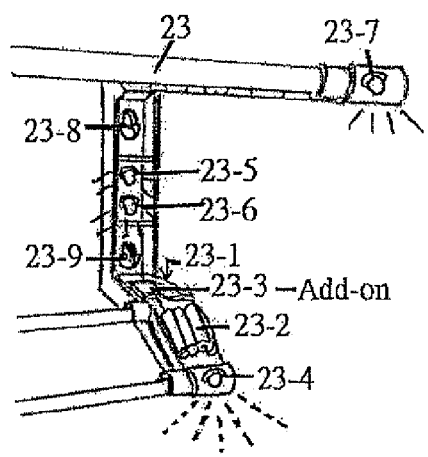

From FIG. 23 shows another variation of the eleventh preferred embodiment, in which the surface mounted device (23) is a rack device having a plurality of the tubes for use anywhere people stay. The device (23) has a geometric shape accommodating installation means such as a telescoping hook (23-8) (23-9), nail, screw, or other installation means (not shown) and added-on LED light units (23-4) (23-5) (23-6) that are separated from the existing rack device and have preferred parts and accessories selected from the group including a power source, circuit means (23-1), conductive means, switch means, sensor means, IC, LED elements in a variety of specifications, timer means, solar power, AC power and parts, DC power (23-3) and parts to get the desired light effects and performance with pre-determined color, brightness, duration, function, and light show effects.

Figure 24B:
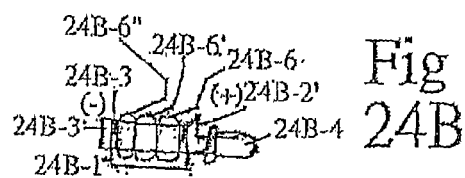
Figure 24A:
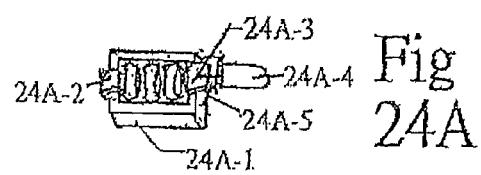
Figure 24:
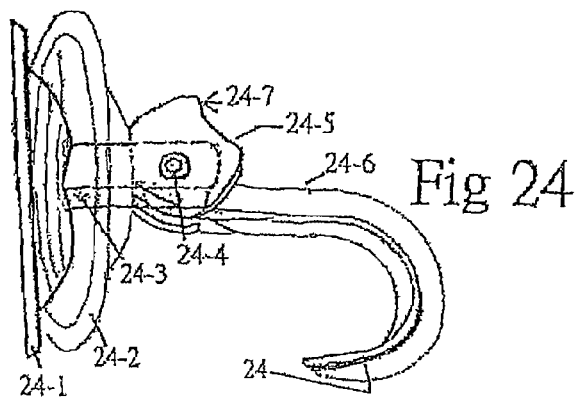

FIG. 24 show shows a twelfth preferred embodiment, in which the surface mounted device (24) is a suction cup device having three major components (AA), including suction cup (24-1) with pole (24-3) and disc base injected with a clear suction cup material (24-1) (BB) cover (24-2) and (CC) hook having pressed tight lock means with a raised point (24-7) on an edge to allow fastening and locking of the soft suction cup material, the clear suction cup deforming and causing air to be pressed out to attach the surface mounted device to a smooth surface. The device (24) has a geometric shape that accommodates installation means in the form of a soft material disc-like suction cup and a built-in LED light unit (not shown) with preferred parts and accessories selected from a power source, circuit means, conductive means, switch means, sensor means, IC, LED elements in a variety of specifications, timer means, solar power, AC power and parts, and DC power and parts to obtain desired light effects and performance with pre-determined color, brightness, duration, function, and light show effects.

Figure 25:
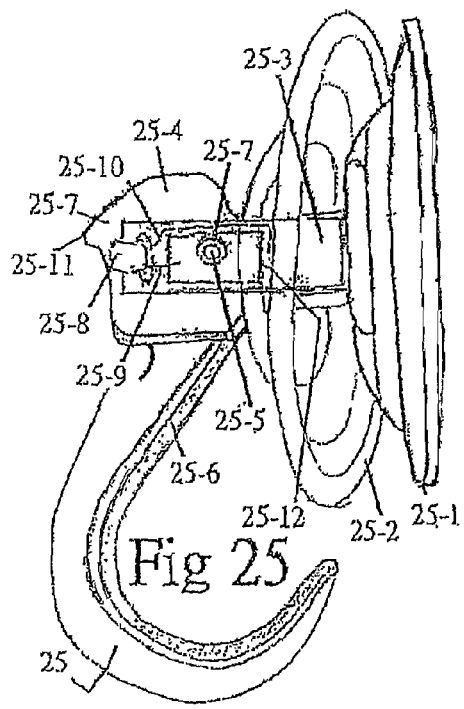

FIG. 25 a twelfth preferred embodiment, in which surface mounted device (25) includes a suction cup device having three major components including (AA) a suction cup (25-1) with pole (25-3) and disc base injected with the clear suction cup material (25-1) (BB), a cover (25-2), and (CC) a hook with pressed tight lock means having a raised point (25-11) on an edge to allow fastening and locking of the soft suction cup material to provide solid attachment of the clear suction cup upon deforming and pressing out the air so that the hook (25-6) can hang anything. The device (25) has a geometric shape that accommodates the soft material disc-like suction cup and a built-in LED light unit (25-8) with preferred parts and accessories selected from a power source (not shown), circuit means, conductive means, switch means, sensor means, compartment means (25-12), an IC, LED elements in a variety of specifications, timer means, solar power, AC power and parts, and DC power and parts (not shown) to get desired light effects and performance with pre-determined color, brightness, duration, function, and light show effects.

Figure 26:
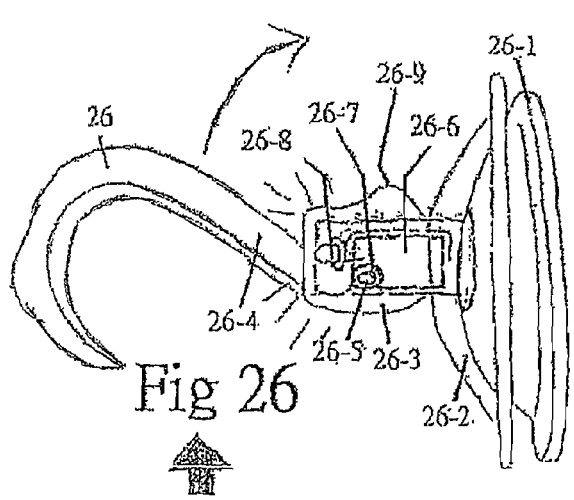

FIG. 26 shows a version of the twelfth preferred embodiment in which the surface mounted device (26) is a suction cup device having three major components including: (AA) a suction cup (26-1) with pole (26-3) and disc base injected with the clear suction cup material (26-1), (BB) a cover (26-2) (CC) hook with pressed tight lock means having a raised point (26-9) on an edge to allow fastening and locking of the soft suction cup material to provide solid attachment when the clear suction cup is deformed and air is pressed out to hang anything anywhere people stay. The device (26) has a geometric shape that accommodates the soft material disc-like suction cup and a built-in LED light unit (26-8) with preferred parts and accessories selected from a power source (not shown), circuit means, conductive means, switch means, sensor means, compartment means (25-12), an IC, LED elements in a variety of specifications, timer means, solar power, AC power and parts, and DC power and parts (not shown) to get desired light effects and performance with pre-determined color, brightness, duration, function, and light show effects.

Figure 27:
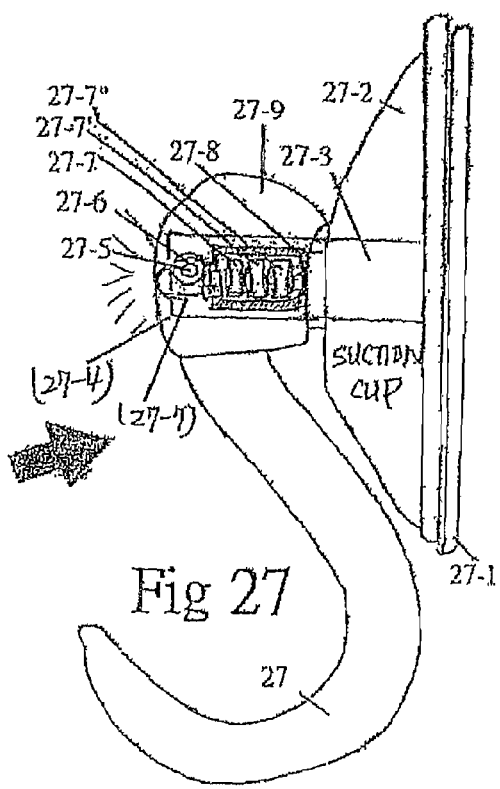

FIG. 27 also shows a version of the twelfth preferred embodiment, in which surface mounted device (27) is a suction cup device having three major components: (AA) a suction cup (27-1) with a pole (27-3) and disc base injected with the clear suction cup material (27-1); (BB) a cover (27-2); and (CC) a hook with pressed tight lock means having a raised point (27-9) on an edge to allow fastening and locking of the soft suction cup material upon deformation of the clear suction cup deforming and pressing out of air, providing a solid attachment on the smooth surface to allow the suction cup with hook to hang anything anywhere people stay. The device (27) has a geometric shape that accommodates the soft material disc-like suction cup and a built-in LED light unit (27-7) with preferred parts and accessories selected from a power source, circuit means, conductive means, switch means, sensor means, compartment means (27-8), IC, LED elements in a variety of specifications, timer means, solar power, AC power and parts, and DC power and parts (27-7) (27-7') (27-7") to get desired light effects and performance with pre-determined color, brightness, duration, function, and light show effects.

FIG. 28 shows another version of the twelfth preferred embodiment, in which the surface mounted device (28) is a suction cup device having three major components: (AA) a suction cup (28) having a pole (28-2) and disc base (28-1) with material flow-in holes (28-6) injected with the clear suction cup material (28); (BB) a cover (28'); and (CC) a hook (28") with pressed tight lock means that include a raised point (28-9) on an edge to allow deformation of the soft suction cup material and pressing out of the air to fasten and lock the suction cup to a smooth surface and allow the suction cup with hook (28") to hang anything anywhere people stay. The device (28) has a geometric shape to accommodate the soft material disc-like suction cup (28) and a built-in LED light unit (28-4) with preferred parts and accessories such as a power source, circuit means, conductive means, switch means, sensor means, compartment means (28-3), IC, LED elements in a variety of specifications, timer means, solar power, AC power and parts, and DC power and parts (28-5) (28-5') (28-5") to get desired light effects and performance with pre-determined color, brightness, duration, function, and light show effects.

FIG. 29 shows a thirteenth preferred embodiment, in which the surface mounted device (29) is a rack device (29') (29") with a plurality of the tubes and two ends having bases (29-1) (29-2). The device (29) has a geometric shape with installation means in the form of a telescoping hook, nail, screw, or other installation means (29-20) (29-21) and built-in LED light units (29-12) (29-13) (29-14) (29-15) arranged to get power from a built-in power pack (29-3) and including parts and accessories selected from a power source, circuit means, compartment means (29-10), conductive means (29-16) (19-17) (29-18) (29-19), switch means, sensor means (29-15), an IC, LED elements (29-11) (29-12) (29-13) (29-14) (29-15) in a variety of specifications, timer means, solar power, AC power and parts, and DC power and parts to get desired light effects and performance with pre-determined color, brightness, duration, function, and light show effects. The surface mounted device also can have added-on LED light units (29-6) (29-7) and get power from an added-on power pack (29-4) preferably having parts and accessories selected from a power source, circuit means, compartment means (29-5), conductive means (29-6') (29-7'), switch means (29-8), sensor means, an IC, LED elements (29-6) (29-7) in a variety of specifications, timer means, solar power, AC power and parts, and DC power and parts to get desired light effects and performance with pre-determined color, brightness, duration, function, and light show effects.

Figure 36:
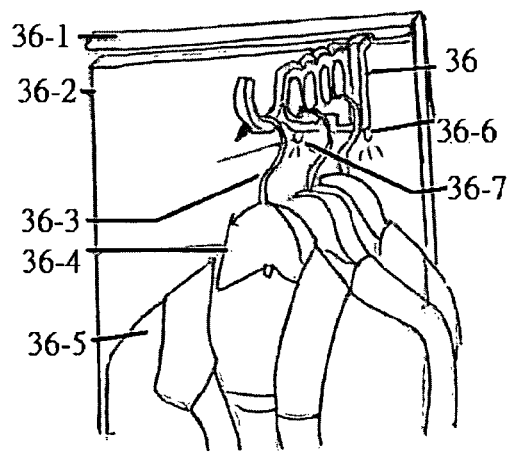

FIG. 30 shows a fourteenth preferred embodiment, in which the surface mounted device (30) is a hanger device having multiple slots for hanging a lot of clothes hangers (not shown, but see FIG. 36). The device (30) has a geometric shape arranged to accommodate installation means in the form of a U-shape hook (30-1) to hang on a certain width of board such as a door (30"), and built-in LED light units (30-4) (30-5) (30-6) with preferred parts and accessories selected from a power source, circuit means, conductive means, switch means, sensor means, IC, LED elements in a variety of specifications, timer means, solar power, AC power and parts, and DC power and parts to get desired light effects and performance with pre-determined color, brightness, duration, function, and light show effects.

FIG. 31 shows a fifteenth preferred embodiment, in which the surface mounted device (31) is a hanger device for a roof's aluminum frame, the hanger device having two side clips (31-3) (31-4) which are removable when open and closed. Device (31) can hang all kind of the objects such as plants or decoration items, slogans, wind-music items or other objects used anywhere where there is an aluminum frame from which the objects can be hung. The device (31) has a geometric shape arranged to accommodate installation means including the U-shape clippers (31-3) (31-4) to hang on the ceiling of the aluminum frame and built-in LED light units (31-7) (31-8) having preferred parts and accessories selected from a power source, circuit means, conductive means, switch means, sensor means, IC, LED elements in a variety of specifications, timer means, solar power, AC power and parts, and DC power and parts to get desired light effects and performance with pre-determined color, brightness, duration, function, and light show effects.

Figure 32:
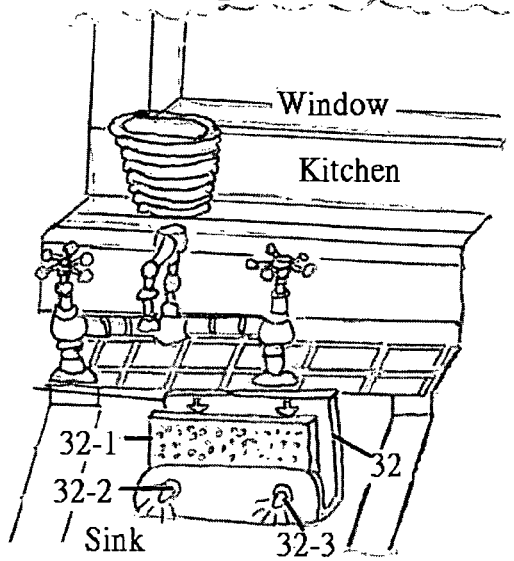

FIG. 32 shows a sixteenth preferred embodiment, in which surface mounted device (32) is a hanger device having a tray that can storage anything used by people. The device (32) has a geometric shape that accommodates installation means such as a telescoping hook and suction cup, glue, or tape to install the device (32) on a kitchen sink, and built-in LED light units (32-2) (32-3) with preferred parts and accessories selected from a power source, circuit means, conductive means, switch means, sensor means, IC, LED elements in a variety of specifications, timer means, solar power, AC power and parts, and DC power and parts to get desired light effects and performance with pre-determined color, brightness, duration, function, and light show effects.

Figure 33:
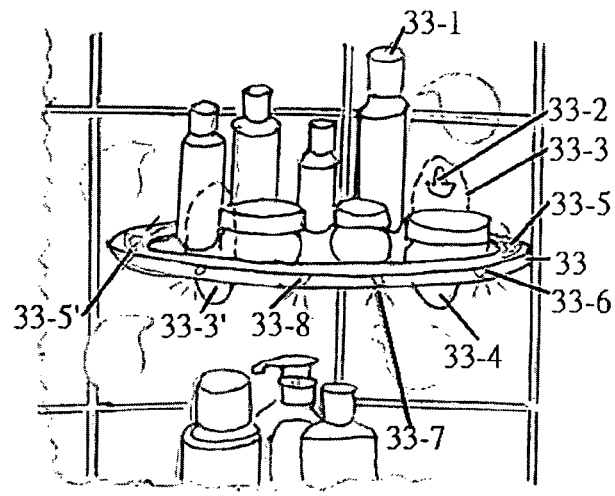

FIG. 33 shows a seventeenth preferred embodiment, in which surface mounted device (33) is a hanger device having a tray that can store a lot of bottles (33-1), cans, other bathroom, restroom, or bedroom accessories, or almost anything used where people stay. The device (33) has a geometric shape that accommodates installation means such as a telescoping hook, suction cup, glue, tape, a nail, or a screw to install on a surface, and built-in LED light units (33-5) (33-5') (33-6) (33-7) (33-8) with preferred parts and accessories selected from a power source, circuit means, conductive means, switch means, sensor means, IC, LED elements in a variety of specifications, timer means, solar power, AC power and parts, and DC power and parts to get desired light effects and performance with pre-determined color, brightness, duration, function, and light show effects.

Figure 34:

FIG. 34 shows a version of the fifteenth preferred embodiment also shown in FIG. 31, in which surface mounted device (34-1) (34-4) is a hanger device for a roof's aluminum frame and has two side clips (31-3) (31-4) which are removable when opened and closed. Device (31) can hang all kind of the objects such as plants (34-2) or decoration items (34-3), slogans, a wind-chime, wind-music items or other objects used anywhere an aluminum frame of the type illustrated might be provided. The device (31) has a geometric shape that accommodates installation means in the form of the U-shape clips (31-3) (31-4) to hang on the ceiling of the aluminum frame, and built-in LED light units (31-7) (31-8) with preferred parts and accessories selected from a power source, circuit means, conductive means, switch means, sensor means, IC, LED elements in a variety of specifications, timer means, solar power, AC power and parts, and DC power and parts to get desired light effects and performance with pre-determined color, brightness, duration, function, and light show effects.

Figure 35:
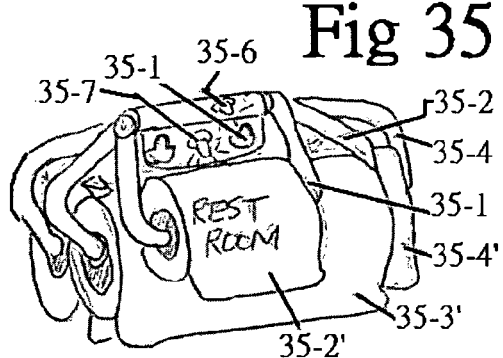

FIG. 35 shows an eighteenth preferred embodiment, in which surface mounted device (35) is a paper roll storage device (35) which is extendable for different sizes (35-2) (35-3) (35-4) of paper rolls (35-2') (35-3') (35-4') to use in a restroom. The device (35) has geometric shape that accommodates installation means such as a telescoping hook, nail, screw, or other installation means (35-1) and built-in LED light units (35-6) (35-7) with preferred parts and accessories selected from a power source, circuit means, conductive means, switch means, sensor means, IC, LED elements in a variety of specifications, timer means, solar power, AC power and parts, and DC power and parts to get the desired light effects and performance with pre-determined color, brightness, duration, function, and light show effects.

FIG. 36 shows another version of the fourteenth preferred embodiment illustrated in FIG. 30, in which the surface mounted device (30) is a hanger device having multiple slots from which can hang a lot of clothes hangers. The device (30) has a geometric shape that accommodates installation means in the form of a U-shape hook (30-1) to hang on a certain width of board such as a door (30"), and a built-in LED light unit (30-4) (30-5) (30-6) with preferred parts and accessories selected from a power source, circuit means, conductive means, switch means, sensor means, IC, LED elements in a variety of specifications, timer means, solar power, AC power and parts, and DC power and parts to get desired light effects and performance with pre-determined color, brightness, duration, function, and light show.

Figure 37:
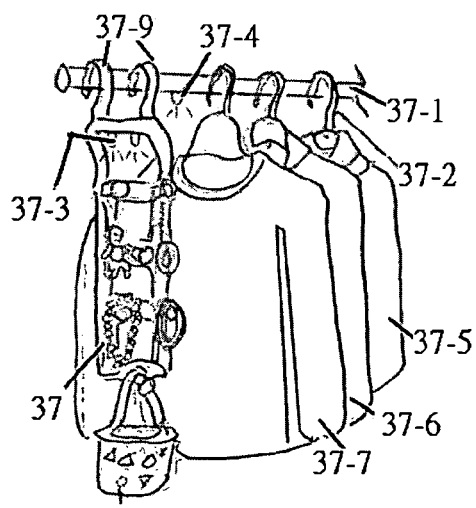

FIG. 37 shows a nineteenth preferred embodiment, in which the surface mounted device (37) is a hanger device providing multiple ways to hang a lot of, chains, key chains, bags, bracelets, ties, belts, or any small objects inside the area of a closet, storage room, or anywhere people stay. The device (37) has a geometric shape that accommodates installation means including a two piece hook (37-9) shaped to hang on the closet bar, a storage room's bar, or whatever, and a built-in LED light unit (37-3) with preferred parts and accessories selected from a power source, circuit means, conductive means, switch means, sensor means, IC, LED elements in a variety of specifications, timer means, solar power, AC power and parts, and DC power and parts to get desired light effects and performance with pre-determined color, brightness, duration, function, and light show effects.

Figure 38:
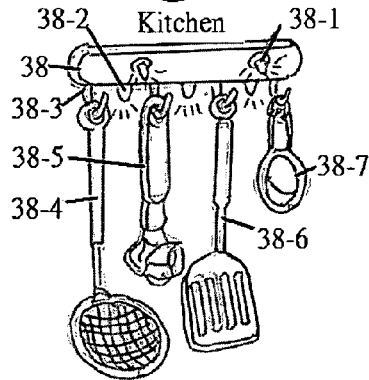

FIG. 38 shows a twenty-first embodiment, in which the surface mounted device (38) is a hanger device includes multiple hooks for hanging a lot of kitchen ware (38-4) (38-6) (38-7), tools (38-5), bathroom accessories, caps, garments, textiles, spoons, forks, or other objects for use anywhere people stay. The device (38) has a geometric shape arranged to accommodate installation means in the form of glue, tape, double side tape, a screw, a nail, telescoping hooks or other available installation means, and built-in LED light units (38-1) (38-2) with preferred parts and accessories selected from a power source, circuit means, conductive means, switch means, sensor means, IC, LED elements in a variety of specifications, timer means, solar power, AC power and parts, and DC power and parts to get desired light effects and performance with pre-determined color, brightness, duration, function, and light show effects.

Figure 39:
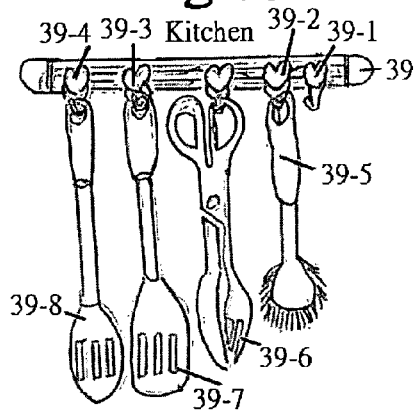

FIG. 39 shows a twenty-second preferred embodiment, in which the surface mounted device (39) is a hanger device having multiple removable hooks for hanging a lot of kitchen ware (39-8) (39-6) (39-7) (39-5), tools, bathroom accessories, caps, garments, textiles or other objects, and almost anything else used anywhere people stay. The device (38) has a geometric shape that accommodates installation means in the form of glue, tape, double side tape, screws, nails, telescoping hooks or other available installation means, built-in LED light units (39-1) (39-2) (39-3) (39-4) with preferred parts and accessories selected from a power source, circuit means, conductive means, switch means, sensor means, IC, LED elements in a variety of specifications, timer means, solar power, AC power and parts, and DC power and parts to get desired light effects, and performance with pre-determined color, brightness, duration, function, and light show effects.

Figure 40:
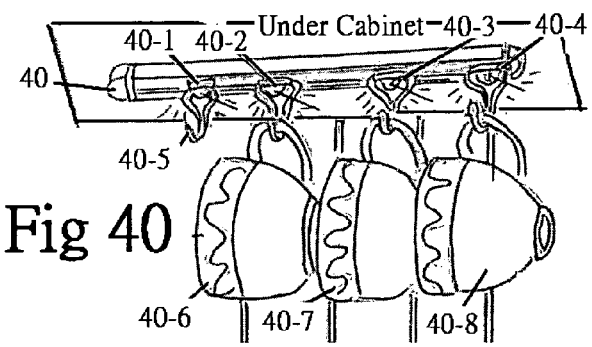

FIG. 40 shows a twenty-third preferred embodiment, in which surface mounted device (40) is same as illustrated in FIG. 39 except that it is configured for under-cabinet installation. Device (40) includes a hanger device having multiple removable hooks that can hang a lot of kitchen ware (40-6) (40-7) (40-8), tools, bathroom accessories, caps, garments, textiles or other objects, or almost anything else used anywhere people stay. The device (40) has a geometric shape arranged to accommodate installation means in the form of glue, tape, double side tape, screws, nails, telescoping hooks or other available installation means to install under the cabinet, as well as built-in LED light units (40-1) (40-2) (40-3) (40-4) with preferred parts and accessories selected from a power source, circuit means, conductive means, switch means, sensor means, IC, LED elements in a variety of specifications, timer means, solar power, AC power and parts, and DC power and parts to get desired light effects and performance with pre-determined color, brightness, duration, function, and light show effects.

Figure 41:
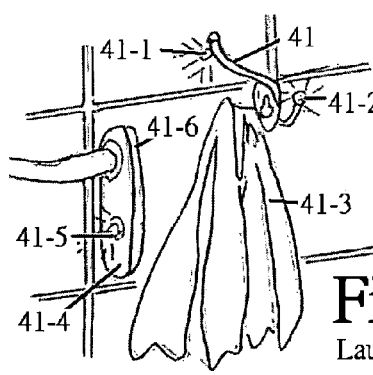

FIG. 41 shows a twenty-fourth preferred embodiment, in which the surface mounted device (41) is a simple hanger device having hooks that can hang a lot of kitchen ware, tools, bathroom accessories (1-3), caps, garments, textiles or other objects, or almost anything used by people. The device (41) has a geometric shape that accommodates installation means in the form of glue, tape, double side tape, a screw, a nail, telescoping hooks or other available installation means to install on a surface, and built-in LED light units (41-1) (41-2) with preferred parts and accessories selected from a power source, circuit means, conductive means, switch means, sensor means, IC, LED elements in a variety of specifications, timer means, solar power, AC power and parts, and DC power and parts to get desired light effects and performance with pre-determined color, brightness, duration, function, and light show effects.

Figure 42:
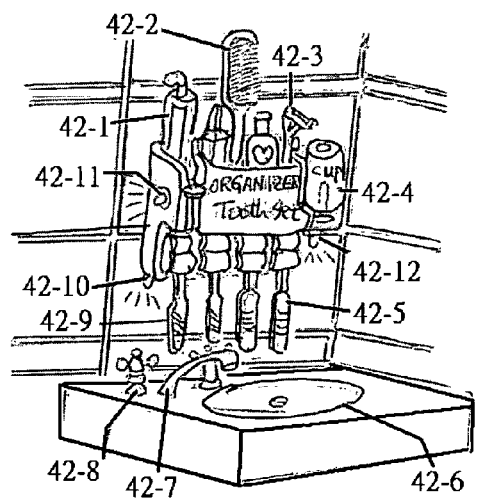

FIG. 42 shows a twenty-fifth preferred embodiment, in which a surface mounted device (42) is a bathroom organizer device having a lot of compartments to let people to insert and store a lot of toothbrushes, a shaver (42-3), a hair brush (42-2), toothpaste (42-1), mouth cup (42-4), bathroom accessories, garments, textiles or other objects, or almost anything else used anywhere people stay. The device (42) has a geometric shape arranged to accommodate installation means in the form of glue, tape, double side tape, a screw, a nail, telescoping hooks or other available installation means to install on a surface, and built-in LED light units (42-10) (42-11) (42-12) with preferred parts and accessories selected from a power source, circuit means, conductive means, switch means, sensor means, IC, LED elements in a variety of specifications, timer means, solar power, AC power and parts, and DC power and parts to get desired light effects and performance with pre-determined color, brightness, duration, function, and light show effects.

Figure 43:
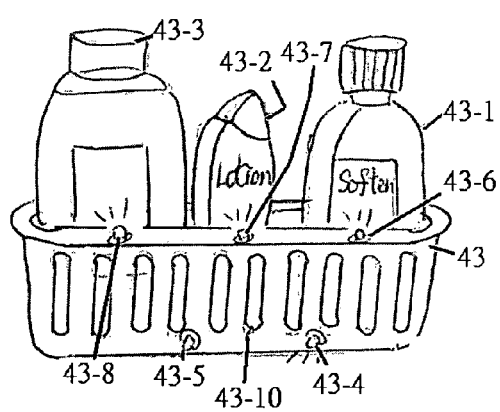

FIG. 43 shows a twenty-sixth preferred embodiment, in which a surface mounted device (43) is a hanger device having a tray that can store a lot of bottles (43-1), cans (43-2), other bathroom or restroom accessories (43-3), and/or bedroom accessories, It almost can store anything used anywhere people stay. The device (43) has a geometric shape that accommodates installation means in the form of a telescoping hook, suction cup, glue, tape, a nail, or a screw to install on a surface, and a built-in LED light unit (43-4) (43-5)(43-6) (43-7) (43-8) with preferred parts and accessories selected from a power source, circuit means, conductive means, switch means, sensor means, IC, LED elements in a variety of specifications, timer means, solar power, AC power and parts, and DC power and parts to get desired light effects and performance with pre-determined color, brightness, duration, function, and light show effects.

While the above-discussed preferred embodiments show the scope of the current invention, it will be appreciated that any alternative or equivalent design, construction, modification, and/or up-grade may still fall within the scope of the invention, which is not limited by the above-discussed and mentioned details. In addition, any alternative or equivalent arrangement, process, installation or the like may also still fall within the scope of the current invention, including variations or modifications of the power source, conductive means, geometric shape of the LED-units, circuit means, sensor means, switch means, LED elements, and/or fixing means.

The invention claimed is:

1. An LED light combined with a surface mounted device, comprising:

at least one surface mounted device arranged to be mounted on a surface of a structure or material including at least one of the following structures or materials: a building, closet, table, ceiling, wall, glass, plastic, wood, porcelain, pottery, paper, chemical, bar, tube, rib, rod, door, or other object, said at least one surface mounted device being mounted on said surface by at least one of the following attachment means: glue, double side tape, a snap, a quick connector, connector means, a clip, a rivet, stitching, a hook and loop fastener, a nail, a screw, a suction cup, a hanger, a chemical compound, super glue, and silicone, for at least one of the following applications: home, office, building, van, car, bus, vessel, boat, aircraft, garden, and indoor or outdoors applications; and said at least one surface mounted device having at least one of the following functions: to hold, hang, store, place, arrange, or organize at least one other object that is in addition to said LED light at a desired location, space, position, orientation, direction, order, or appearance, thereby enabling people to use the LED light combined with a surface mounted device for said lighting function and in addition to hold, hang, store, place, arrange, or organize at least one other object that is in addition to the LED light;

said at least one LED light being situated on the surface mounted device at a predetermined location and having a predetermined construction, said LED light connected by at least one of conductive means, resilient conductive means, and switch means to deliver electric signals from a power supply to said LED light for illumination with a pre-determined function, timing, duration, brightness, and colors, wherein said power supply is included in a housing of the LED light and the LED light has a combination of LED elements, conductive means, resilient conductive means, switch means, sensor means, circuit means, integrated circuit means, and related parts and accessories included or connected to the power supply, said related electrical parts and accessories selected from the group consisting of sensor means, timer means, an energy generator, a solar module, rechargeable batteries, batteries, an alternative current power source, and a direct current power source, all of which are included within said housing of the LED light to add said illumination functions to the additional functions provided by the surface mounted device.

2. An LED light for a surface mounted device, comprising:

at least one surface mounted device arranged to be mounted on a surface of a structure or material including at least one of the following structures or materials: a building, closet, table, ceiling, wall, glass, plastic, wood, porcelain, pottery, paper, chemical, bar, tube, rib, rod, door, or other object, said at least one surface mounted device being mounted on said surface by at least one of the following attachment means: glue, double side tape, a snap, a quick connector, connector means, a clip, a rivet, stitching, a hook and loop fastener, a nail, a screw, a suction cup, a hanger, a chemical compound, super glue, and silicone, for at least one of the following applications: home, office, building, van, car, bus, vessel, boat, aircraft, garden, and indoor or outdoors applications; and said at least one surface mounted device having at least one of the following functions: to hold, hang, store, place, arrange, or organize at least one other object that is in addition to said LED light at a desired location, space, position, orientation, direction, order, or appearance, thereby enabling people to use the LED light combined with a surface mounted device for said lighting function and in addition to hold, hang, store, place, arrange, or organize said at least one other object that is in addition to the LED light;

said at least one LED light being situated on the surface mounted device at a predetermined location and having a predetermined construction, said LED light connected by at least one of conductive means, resilient conductive means, and switch means to deliver electric signals from a power supply to said LED light for illumination with a pre-determined function, timing, duration, brightness, and colors, the improvement wherein the surface mounted device has a predetermined space to fit said LED light, said LED light having its own power supply therein, the LED light or power supply including conductive means, resilient conductive means, switch means, power source, circuit means and related electrical parts and accessories selected from the group consisting of sensor means, timer means, an energy generator, a solar module, rechargeable batteries, batteries, an alternative current power source, and a direct current power source to let the viewer directly see the LED light's beam.

3. The surface mounted device with LED light as claimed in claim 2, wherein the surface mounted device is adapted for use indoors or outdoors a home, office, building, van, car, bus, vessel, boat, aircraft, or space shuttle, and in a kitchen, laundry room, restroom, sleep room, living room, bedroom, garage, patio, garden, drive way, pathway, or outdoors.

4. The surface mounted device with LED light as claimed in claim 2, wherein the surface mounted device is made of wooden, metal, pottery, porcelain, plastic or other conventional material to allow other objects to be arranged and stored.

5. The surface mounted device with LED light as claimed in claim 2, wherein the LED light is added onto an existing surface mounted device.

6. The surface mounted device with LED light as claimed in claim 2, wherein an LED light is built-in to the surface mounted device when making the surface mounted device.

7. The surface mounted device with LED light as claimed in claim 2, wherein the surface mounted device is in the form of one of the following devices: a hook, hanger, suction cup, rack, tray, holder, rod, tube, and wire product, and is installed on an object's surface for use in connection with at least one of the following items: kitchenware, bathroom accessories, towels, toothbrushes, soap, lotion, bottles, cans, textile items, hair dryers, shavers, clothing, hats, caps, garments, coats, papers, tissues, hair clippers, sunglasses, sponges, towels, brushes, plastic tools, garden tools, working tools, wind chimes, and plants.

8. The surface mounted device with LED light as claimed in claim 2, wherein the surface mounted device is arranged to hold, hang, store, put, or arrange objects at a desired location, space, position, orientation within the surface mounted device.

9. The surface mounted device with LED light as claimed in claim 2, wherein the surface mounted device is installed by means of at least one suction cup.

10. The surface mounted device with LED light as claimed in claim 2, the said surface mounted device is installed by means of double side tape.

11. The surface mounted device with LED light as claimed in claim 2, wherein the surface mounted device is installed by means of at least one telescoping hook.

12. The surface mounted device with LED light as claimed in claim 2, wherein the surface mounted device is installed by means of a U-shaped clip.

13. The surface mounted device with LED light as claimed in claim 2, wherein the surface mounted device is installed by means of a hook.

14. The surface mounted device with LED light as claimed in claim 2, wherein the surface mounted device is installed by means of a hanger.

15. The surface mounted device with LED light as claimed in claim 2, wherein the surface mounted device is installed by means of a screw.

16. The surface mounted device with LED light as claimed in claim 2, wherein the surface mounted device is installed by means of a nail.

17. The surface mounted device with LED light as claimed in claim 2, wherein the circuit means incorporates an integrated circuit to cause the LED light to exhibit predetermined light effects including fade in and fade out, chasing, random, steady on, color changing, pair flashing.

* * * * *